(12) United States Patent
Fujiwara et al.

(10) Patent No.: US 6,687,090 B2
(45) Date of Patent: Feb. 3, 2004

(54) HEAD SUSPENSION ASSEMBLY WITH HEAD AMPLIFIER IC

(75) Inventors: Seishiro Fujiwara, Ome (JP); Katsuhiko Kaida, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 09/955,304

(22) Filed: Sep. 19, 2001

(65) Prior Publication Data

US 2002/0034050 A1 Mar. 21, 2002

(30) Foreign Application Priority Data

Sep. 21, 2000 (JP) .......................... 2000-287693

(51) Int. Cl.$^7$ ................................................. G11B 5/48
(52) U.S. Cl. ................................................. 360/244.1
(58) Field of Search ........................... 360/244.1, 242.2, 360/234.4

(56) References Cited

U.S. PATENT DOCUMENTS

| | | | |
|---|---|---|---|
| 4,642,716 A | | 2/1987 | Wakabayashi et al. ...... 360/129 |
| 4,739,431 A | | 4/1988 | Yasuda et al. ............... 360/126 |
| 5,245,489 A | * | 9/1993 | Kimura et al. ........... 360/264.2 |
| 5,510,956 A | * | 4/1996 | Suzuki ....................... 361/704 |
| 6,084,746 A | * | 7/2000 | Shiraishi et al. ......... 360/244.1 |
| 6,282,062 B1 | * | 8/2001 | Shiraishi .................. 360/244.1 |
| 6,437,944 B2 | * | 8/2002 | Ohwe et al. ............. 360/244.1 |
| 6,498,702 B1 | * | 12/2002 | Shimizu et al. .......... 360/244.1 |

FOREIGN PATENT DOCUMENTS

| | | |
|---|---|---|
| EP | 0 911 812 A1 | 4/1999 |
| JP | P 11-250602 | 9/1999 |
| JP | P2000-195023 | 7/2000 |

OTHER PUBLICATIONS

JP 2000067421 A, Patent Abstracts of Japan, Mar. 3, 2000.
Katsumata et al. 09/385,731 filed Aug. 30, 1999.

* cited by examiner

*Primary Examiner*—Jefferson Evans
(74) *Attorney, Agent, or Firm*—Pillsbury Winthrop LLP

(57) ABSTRACT

A head suspension assembly in which a trace having a written pattern is disposed on an arm and a suspension. A slider with a magnetic head formed thereon, and a head amplifier IC are mounted on the wiring pattern. An under fill is injected between the head amplifier IC and the wiring pattern, and an outer surface of the head amplifier IC is coated with a resin.

4 Claims, 2 Drawing Sheets

HEAD SUSPENSION ASSEMBLY WITH HEAD AMPLIFIER IC

CROSS-REFERENCE TO RELATED APPLICATIONS

This application is based upon and claims the benefit of priority from the prior Japanese Patent Application No. 2000-287693, filed Sep. 21, 2000, the entire contents of which are incorporated herein by reference.

BACKGROUND OF THE INVENTION

1. Field of the Invention

The present invention relates to a head suspension assembly in which a head amplifier IC chip is mounted.

2. Description of the Related Art

In general, a magnetic disk apparatus is provided with a head suspension assembly in which a head serving as an electromagnetic conversion element for example, a magnetic head is attached to a slider and supported by a suspension. In the magnetic disk apparatus, an integrated circuit element including a read amplifier circuit for amplifying a signal read from a magnetic disk by the magnetic head and a write driver circuit for changing a direction and supplying a current to the magnetic head to allow the head to write data into the magnetic disk is generally called a head amplifier IC. The conventional head amplifier IC is generally mounted on a flexible printed wiring board (FPC) as a wiring cable member.

On the other hand, in recent years, as described in Jpn. Pat. Appln. KOKAI Publication No. 11-213365, it is proposed that the head amplifier IC should be mounted in the vicinity of the magnetic head, suspended by the head suspension assembly. Thereby, a length of a wiring pattern between the magnetic head and the head amplifier IC is shortened, an inductance and capacitance of the wiring pattern are reduced, and an electrostatic breakdown is prevented from occurring during connection of the magnetic head to the FPC.

Moreover, when the head suspension assembly with the head amplifier IC mounted thereon in this manner is assembled with the magnetic disk apparatus, the head amplifier IC is positioned in the vicinity of the surface of the magnetic disk. Therefore, in order to thin the head amplifier IC, a so-called bear chip having no package formed of a synthetic resin or the like is used as the head amplifier IC.

However, the head amplifier IC constituted of the bear chip as described above is formed by using a dicing blade or the like to cut a silicon wafer with a circuit formed thereon in a desired size in a manufacturing process. In this case, a micro break or crack of the order of 20 to 30 $\mu$m is generated in a portion which directly contacts the dicing blade. Even when various technical countermeasures such as optimizing of the dicing blade and study of an adhesive material are performed to solve the problem, it is difficult to physically completely eliminate the break or the crack.

The head suspension assembly mounted with the head amplifier IC broken or cracked in the manufacturing process is assembled into the magnetic disk apparatus. In this operation, it is expected that the break or the crack of the head amplifier IC grows by vibration/impact caused by external factors, and a broken piece falls down on the surface of the magnetic disk in a worst case. Moreover, it is considered that the fallen broken piece is dragged on the surface of the magnetic disk by the magnetic head slider, the surface of the magnetic disk is damaged and magnetically recorded data cannot be read.

BRIEF SUMMARY OF THE INVENTION

The present invention has been developed in consideration of the aforementioned respect, and its object is to provide a head suspension assembly which is improved in reliability.

According to an aspect of the present invention, there is provided a head suspension assembly comprising: a suspension; a wiring pattern disposed on the suspension; a magnetic head including a bear chip, mounted on the wiring pattern, and configured to record/reproduce information with respect to a magnetic recording medium; and a head amplifier IC mounted on the wiring pattern, and configured to amplify a read signal of the magnetic head, an outer surface of the head amplifier IC being coated with a resin.

According to another aspect of the present invention, there is provided a head suspension assembly comprising: a suspension; a wiring pattern disposed on the suspension; a magnetic head including a bear chip, mounted on the wiring pattern, and configured to recording/reproduce information with respect to a magnetic recording medium; a head amplifier IC mounted on the wiring pattern and configured to amplify a read signal of the magnetic head; an under fill charged between the head amplifier IC and the wiring pattern; and a resin tape coating an outer surface of the head amplifier IC.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A head suspension assembly according to an embodiment of the present invention will be described in detail with reference to the accompanying drawings.

Figure 1:
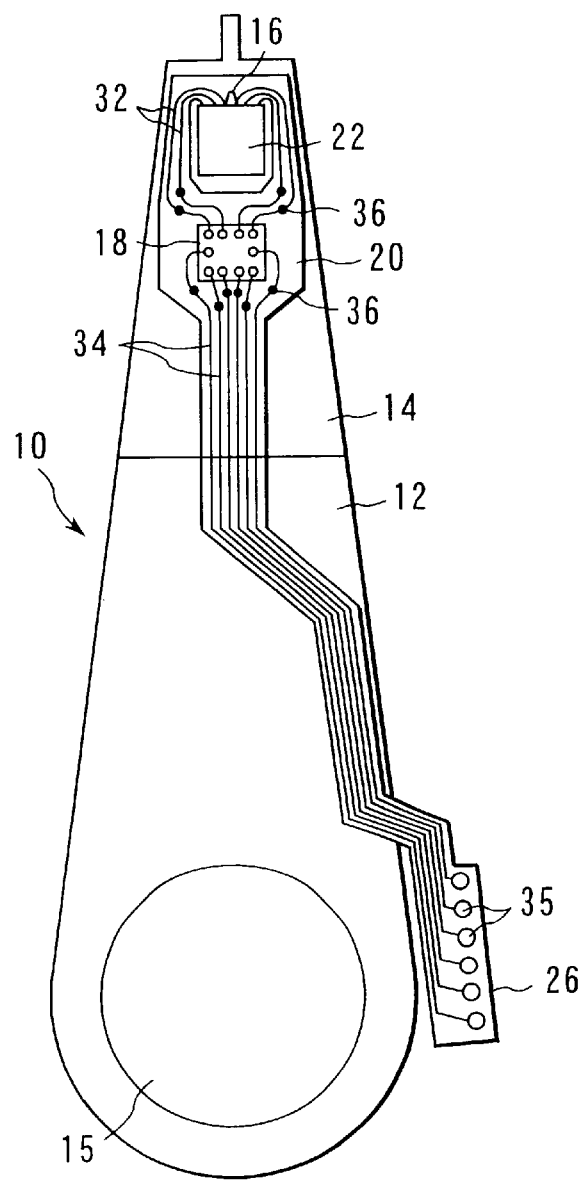
FIG. 1 is a plan view of a head suspension assembly according to an embodiment of the present invention.

As shown in FIG. 1, a head suspension assembly (hereinafter referred to as HSA) 10 comprises an arm 12, and a suspension 14 whose base end is fixed to a distal end of the arm 12 by spot welding or adhesive and which extends from the arm 12. The arm 12 formed in a shape of a thin flat plate with thickness of about 250 $\mu$m by, for example, a stainless steel-based material such as SUS304, and a circular through hole 15 is formed in a base end of the arm. The suspension 14 is constituted of an elongated leaf spring with a thickness of 60 to 70 µm. The suspension 14 may be formed integrally with the arm 12 by the same material as that of the arm.

The HSA 10 is attached to a bearing assembly of a magnetic disk apparatus by passing a hub of the bearing assembly through the through hole 15 of the arm 12, and rotated around the bearing assembly by a voice coil motor as a drive mechanism. Moreover, when the HSA 10 rotates, the distal end of the suspension 14 moves substantially in a radial direction of a magnetic disk.

Moreover, the HSA 10 comprises a trace 20 fixed on the suspension 14 and arm 12 as described later, a magnetic head 16 as an electromagnetic conversion element mounted on the trace 20 and supported by the distal end of the suspension 14, and a head IC chip 18 mounted on the trace 20, for amplifying a read signal of the magnetic head 16. As the magnetic head 16, a composite separated magnetic head including a reproducing (reading) MR element (magnetoresistive effect element) and a recording (writing) thin film head is used.

The magnetic head 16 is fixed to a rectangular slider 22, and the slider 22 is attached to a gimbal portion (not shown) disposed on the distal end portion of the suspension 14. The slider 22 is pressurized toward the magnetic disk by a function of the suspension 14 as the leaf spring, and serves to raise the magnetic head 16 above the surface of the magnetic disk by a substantially constant distance by a pneumatic pressure generated by rotation of the magnetic disk.

Figure 2:
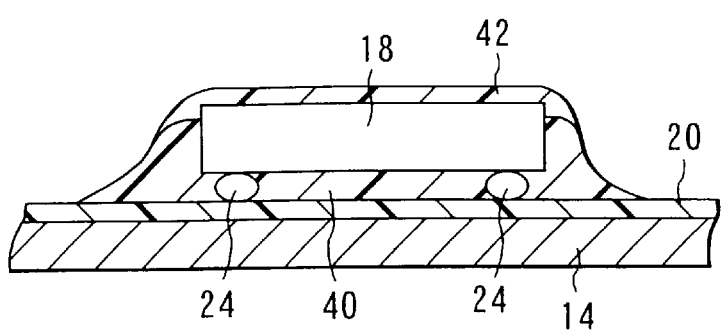
FIG. 2 is an enlarged sectional view of a head amplifier IC mounted portion in the head suspension assembly.

As shown in FIG. 1 and FIG. 2, the head amplifier IC 18 is constituted as the bear chip in a flat rectangular shape. Moreover, ten bumps 24 for electric connection are disposed on one a surface of the head amplifier IC 18, and functions, for example, as input/output terminals. The head amplifier IC 18 is mounted in a position on the suspension 14 apart from the slider 22 toward the arm 12, that is, in a position opposite to the magnetic head 16 interposing the slider 22 therebetween.

The magnetic head 16 and head amplifier IC 18 are electrically connected to each other via the trace 20, and electrically connected to a controller of the magnetic disk apparatus. The trace 20 includes a stainless steel plate and a relay flexible printed circuit board (hereinafter referred to as the relay FPC) formed on the stainless steel plate, and is formed in an elongated strip shape. The trace 20 is fixed on the suspension 14 and arm 12, and extends to a midway portion of the arm 12 from the distal end of the suspension 14. A soldering pad portion 26 disposed on a base end of the trace 20 extends outwardly from the arm 12. Moreover, the slider 22 and head amplifier IC 18 are mounted on the trace 20.

The relay FPC of the trace 20 includes a wiring pattern including four conductors 32 for connecting, for example, four electrodes of the magnetic head 16 to four out of the ten bumps 24 of the head amplifier IC 18, and a wiring pattern including six conductors 34 for connecting the remaining six bumps 24 of the head amplifier IC 18 to the soldering pad portion 26.

The soldering pad portion 26 constitutes a connection end of the trace 20, and has the same number of electrode pads as that of the conductors 34, that is, six electrode pads 35. The soldering pad portion 26 is connected to a main FPC, not shown, of the magnetic disk apparatus. Moreover, testing pads 36 are disposed on the respective conductors 32 and 34 in the vicinity of the head amplifier IC 18.

The head amplifier IC 18 is mounted on the trace 20 while the bumps 24 of the IC 18 are aligned with the pads of the trace 20. However, bonding only by the bumps 24 has a low strength. Therefore, when a force is applied from the outside, the bumps 24 are possibly stripped from the pads. To solve the problem, as shown in FIG. 2, for the purpose of increasing the bonding strength, a resin called an under fill 40 is applied to a gap of a bonded portion between the head amplifier IC 18 and the trace 20.

The under fill 40 enters the gap of the bonded portion by capillary action without leaving a bubble. If the bubble permeates the gap, the head amplifier IC is supposedly cracked or the bumps 24 are stripped from the pads because of a difference of thermal expansion coefficient between the resin and the bubble caused by a temperature change. Therefore, a resin having a superior fluidity is used in the under fill 40, and the under fill is charged without permeation of the bubble. That is, typical examples of the under fill 40 include an epoxy-based resin having a viscosity of about 500 to 2000.

Moreover, according to the present embodiment, after the head amplifier IC 18 is mounted, a small amount of under fill 40 is applied to the back surface, that is, the outer surface of the head amplifier IC 18. For example, a very thin resin film 42 with a thickness of 10 to 20 µm is formed on the whole outer surface of the head amplifier IC, and the outer surface of the head amplifier IC 18 is coated with the film. Moreover, since the under fill 40 has a superior fluidity, even breaks or cracks of the head amplifier IC 18 generated in the manufacturing process are filled by the under fill without any gaps remaining. Therefore, when this treatment is performed, and while the HSA 10 is assembled in the magnetic disk apparatus, breaks or cracks of the head amplifier IC 18 can be prevented from growing by vibration, impact, and the like. The possibility of the broken piece of the head amplifier IC 18 falling down onto the surface of the magnetic disk can be eliminated.

A process of manufacturing the head amplifier IC for use in the aforementioned head suspension assembly will next be described.

Figure 3:
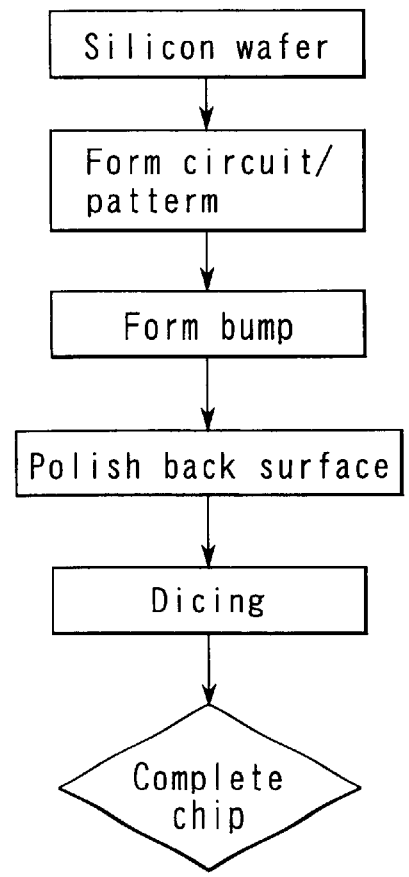
FIG. 3 is a sectional view showing that the head suspension assembly is assembled into a magnetic disk apparatus.

As shown in FIG. 3, similarly as a usual IC manufacturing process, after a circuit and wiring for connecting circuit elements to one another are formed on a silicon wafer by treatments such as exposure, etching, and diffusion, metal bumps for connecting IC signal pads to the pads disposed on the FPC are formed on a circuit forming surface. Typical examples of the metal bump include a solder ball bump, Au stud bump, and the like.

The next polishing step is not often included in the usual IC manufacturing process, but is included in the process of manufacturing the head amplifier IC to be mounted on the head suspension assembly because the IC needs to be thinned. The step includes a back surface polishing step in which the surface with no bump formed thereon is polished. Here, the surface with no bump formed thereon is referred to as the back surface.

Figure 4:
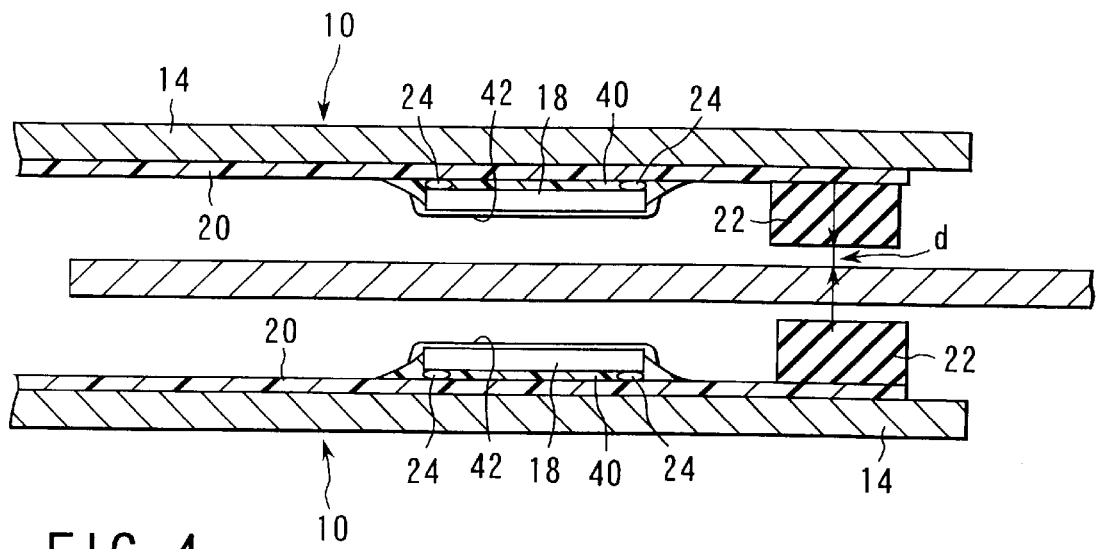
FIG. 4 is a flowchart showing a process of manufacturing the head amplifier IC.

As shown in FIG. 4, when the head suspension assembly is assembled into the magnetic disk apparatus, each slider 22 floats at a remarkably low height d of the order of 15 to 30 nm above the surface of the magnetic disk 14. A thickness of the slider 22 itself is about 300 µm, and the thickness of the head amplifier IC 18 mounted in the vicinity of the slider needs to be limited. Therefore, in the manufacturing process of the head amplifier IC, in order to thin the silicon wafer, after the circuit is formed, the back surface of the silicon wafer is cut by a polishing machine. The back surface is polished until the thickness of the silicon wafer reaches to about 100 μm to 200 μm from 700 μm.

Figure 5:
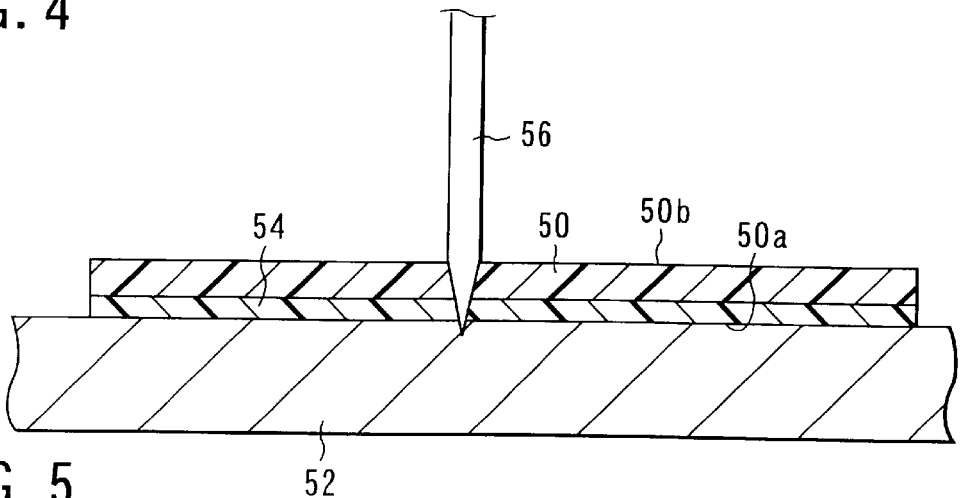
FIG. 5 is a sectional view showing a process of dicing the head amplifier IC.

Next a dicing step is performed to divide the silicon wafer to respective chips. As shown in FIG. 5, in the dicing step, after a circuit forming surface 50a of a silicon wafer 50 is attached to a base 52 via an adhesive 54, the silicon wafer 50 is cut in a predetermined size by a rotating dicing blade 56, so that the head amplifier IC 18 is completed.

During the dicing, micro breaks or cracks are sometimes generated over about 20 to 30 μm on a back surface 56b of the silicon wafer 50 which directly contacts the dicing blade 56. As described above, according to the present embodiment, after the head amplifier IC 18 is mounted on the suspension trace 20 and the under fill 40 is charged, a small amount of under fill 40 is applied to the back surface of the head amplifier IC 18. For example, a resin film 42 with a thickness of 10 to 20 μm is formed on the whole outer surface of the head amplifier IC so that the outer surface of the head amplifier IC is coated.

According to the head suspension assembly constituted as described above, the outer surface of the head amplifier IC 18 is coated with the under fill, i.e., the resin film 42. Even when the head amplifier IC is broken or cracked in the manufacturing process, the broken piece of the head amplifier IC can be prevented from falling down on the surface of the magnetic disk, and reliability can be enhanced.

When the epoxy-based resin having a viscosity of 500 to 2000, the silicon-based resin, or the same material as that of the under fill is used as the resin, the resin penetrates into the break or the crack generated in the manufacturing process, and broken pieces can be securely prevented from being generated.

Additionally, the present invention is not limited to the aforementioned embodiment, and can be variously modified within the scope of the present invention. For example, the resin with which the outer surface of the head amplifier IC 18 is to be coated may be a resin having the aforementioned predetermined viscosity. The resin is not limited to the same resin as the under fill, a silicon-based resin may also be used, and other various resins may be selected if necessary.

Figure 6:
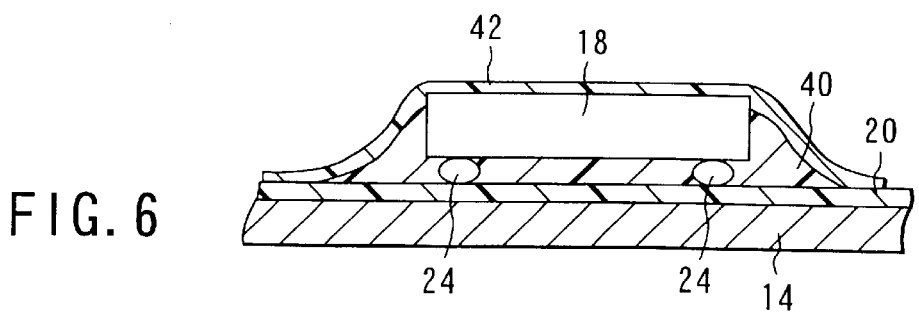
FIG. 6 is an enlarged sectional view of the head amplifier IC mounted portion in the head suspension assembly according to another embodiment of the present invention.

In the aforementioned embodiment, the head amplifier IC is coated with the applied resin. Instead, as shown in FIG. 6, a resin tape 60 may be attached to the back surface of the head amplifier IC 18 so that the outer surface of the head amplifier IC is coated. As the resin tape 60, for example, a tape formed of the epoxy-based resin and having a thickness of about 10 to 50 μm can be used. Furthermore, even when the resin tape 60 is used instead of the resin coat, broken pieces of the head amplifier IC can be prevented from falling down on the magnetic disk surface, and the reliability can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head suspension assembly comprising
   a suspension;
   a wiring pattern disposed on the suspension;
   a magnetic head, mounted on the wiring pattern, and configured to record/reproduce information with respect to a magnetic recording medium; and
   a head amplifier IC including a bear chip, mounted on the wiring pattern, and configured to amplify a read signal of the magnetic head, an under fill being injected into a gap between the head amplifier IC and the wiring pattern, and the entire outer surface of the head amplifier IC being coated with the same material as that of the under fill.

2. A head suspension assembly according to claim 1, wherein the outer surface of the head amplifier IC is coated with an epoxy-based resin or a silicon-based resin.

3. A head suspension assembly according to claim 1, wherein the outer surface of the head amplifier IC is coated with an epoxy-based resin having a viscosity of 500 to 2000.

4. A head suspension assembly comprising:
   a suspension;
   a wiring pattern disposed on the suspension;
   a magnetic head chip, mounted on the wiring pattern, and configured to recording/reproduce information with respect to a magnetic recording medium;
   a head amplifier IC mounted on the wiring pattern and configured to amplify a read signal of the magnetic head;
   an under fill injected between the head amplifier IC and the wiring pattern; and
   a resin tape coating an outer surface of the head amplifier IC.

* * * * *